E. JEWELL.
Improvement in Floats for Fishing-Lines.
No. 128,885. Patented July 9, 1872.
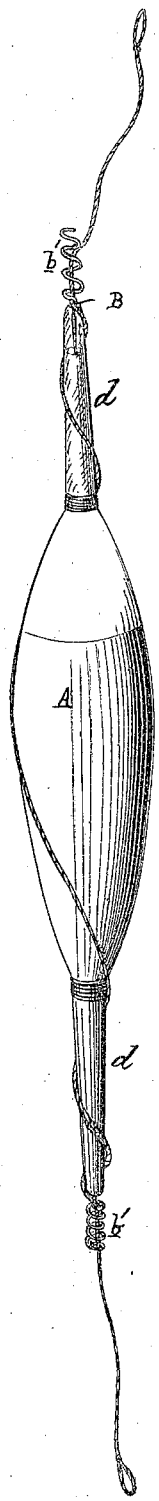
ATTEST:
H. S. Sprague
H. F. Eberth
INVENTOR:
E. Jewell
Per atty—
Thos. S. Sprague

UNITED STATES PATENT OFFICE.

EDWARD JEWELL, OF LOUISVILLE, KENTUCKY.

IMPROVEMENT IN FLOATS FOR FISHING-LINES.

Specification forming part of Letters Patent No. 128,885, dated July 9, 1872.

*To whom it may concern:*

Be it known that I, EDWARD JEWELL, of Louisville, in the county of Jefferson and State of Kentucky, have invented a new and useful Improvement in Float for Fishing-Lines; and I do declare that the following is a true and accurate description thereof, reference being had to the accompanying drawing and to the letters of reference marked thereon and being a part of this specification, in which my improved float is shown in perspective.

The nature of this invention relates to an improvement in the means of attaching floats to fishing-lines, so that while the float can readily be moved on the line it cannot accidentally be detached. The invention consists in providing the tips of the float-shaft with a spirally-coiled wire, through which coil the line passes, as hereinafter described.

In the drawing, A represents the ordinary buoy-shaped fishing-float with a spindle, $d$, projecting from each end. Hitherto it has been usual to attach a wire loop to each spindle through which the line was rove, and from which the float could not be removed except by cutting the line or detaching it from the pole. This objection does not attach to my float. I bore through the float and spindles, and pass through them a wire, B, with a spiral coil, $b'$, formed at the projecting extremities thereof.

The line may be coiled spirally about the float one or more turns to give the requisite tension, and thus prevent the float from slipping on the line. The float is secured by taking the line to the base of each spiral, and winding in the convolutions of the coils until contained within them, as shown at the lower part of the drawing, the manner of introducing the line being shown in the upper part thereof.

This arrangement permits the float to be moved by hand up or down on the line, while it can only be detached by uncoiling the line from the spirals.

What I claim as my invention, and desire to secure by Letters Patent, is—

The float described, consisting of the body A and longitudinal wire B, the latter being provided with spirals $b'$ at each end, as and for the purpose described.

EDWARD JEWELL.

Witnesses:
 ARTHUR BLAND,
 P. Z. AYLSWORTH.